United States Patent [19]

Newman

[11] 4,302,624

[45] Nov. 24, 1981

[54] ELECTRIC WALL OUTLET PROTECTOR

[76] Inventor: Fredric M. Newman, 29040 Apple Blossom La., Farmington Hills, Mich. 48018

[21] Appl. No.: 150,557

[22] Filed: May 16, 1980

[51] Int. Cl.³ .............................................. H02G 3/14

[52] U.S. Cl. ........................................ 174/67; 339/36; 339/41

[58] Field of Search .......................... 174/67; 220/242; 339/36, 37, 40, 41, 43, 44 R, 44 M

[56] References Cited

U.S. PATENT DOCUMENTS

| | | | |
|---|---|---|---|
| 943,016 | 12/1909 | Guett | 339/41 |
| 2,559,151 | 7/1951 | Getzoff | 174/67 X |
| 2,820,842 | 1/1958 | Meistrell | 339/40 X |
| 3,137,407 | 6/1964 | Mackiewicz | 220/242 |
| 3,956,573 | 5/1976 | Myers et al. | 174/67 X |

*Primary Examiner*—Gene Z. Rubinson
*Assistant Examiner*—D. A. Tone
*Attorney, Agent, or Firm*—Barnes, Kisselle, Raisch & Choate

[57] ABSTRACT

A wall electrical outlet protector for children which is integral with or mountable on an electric outlet wall plate which includes doors swingable in the plane of the wall against a return spring bias to an open position to allow access to the wall outlet. Interengaging edges present prying of the doors away from the unit and optional detents may be utilized to provide resistance to opening of the doors. The protector may be easily applied without disturbing the electrical wiring but can only be removed by the unscrewing of the plate retention screw using a screwdriver.

8 Claims, 9 Drawing Figures

ELECTRIC WALL OUTLET PROTECTOR

FIELD OF INVENTION

A safety protector for electric wall outlet plugs to prevent access by children.

BACKGROUND OF INVENTION

Electric wall outlet plugs are usually at a level where children at an early age find them practically at eye level. Since children observe adults pushing plugs into these outlets, their propensity for imitation prompts them to attempt to do the same. Consequently, when they find small metal objects, such as nails, paper clips or keys, they seek to push them into the slots of the wall outlet. If they reach the hot side of the outlet, this can cause servere electric shock and perhaps death due to any shorting to a grounded object.

Attempts have been made to solve this problem by providing spring-biased rotating discs, for example, on a wall plug which require manual rotation to permit penetration of the plug prongs. Some of these devices require installation by a licensed electrician or they consist of double plugs which can easily be removed by a two or three-year old child. Other more cumbersome box-like protectors require a squeezing action to be removed but these are cumbersome and unattractive. They project from the wall to the extent that they may be knocked off or fractured by contact with furniture, vacuum cleaners and the like.

It is an object of the present invention to provide a childproof wall outlet protector which is attractive in appearance while having only a slight projection from the wall plug plate.

It is a further object to provide an outlet protector which can be readily applied to an existing outlet plate by a homeowner, requiring only a screwdriver, and necessitating no contact with the electrical connections of the outlet.

It is a further object to provide an outlet protector which automatically closes when not in use and which is interlated with a support housing to prevent it being pried open.

An additional feature of the device lies in the need for a movement of the protector door and holding it against a fairly stiff return spring until a plug is inserted. This requires a coordination and double movement which will deter a young child from inserting a conductor into a receptacle opening.

It is a still further object to provide a wall outlet protection which is simple in construction and which can be manufactured and sold at a price which will make it available to all without undue financial outlay.

Another object is the provision of an outlet protector which is self-stabilizing with a single screw mount and which blocks cold air in the structural wall from flowing into a room.

Other objects and features of the invention will be apparent in the following description and claims in which the principles of the invention are disclosed together with a disclosure of the manner and process of using the invention directed to persons skilled in the art, all in connection with the best mode presently contemplated for the practice of the invention.

BRIEF DESCRIPTION OF THE DRAWINGS

Drawings accompany the disclosure and the various views thereof may be briefly described as.

DESCRIPTION OF THE INVENTION AND THE MANNER AND PROCESS OF USING IT

Figure 1:
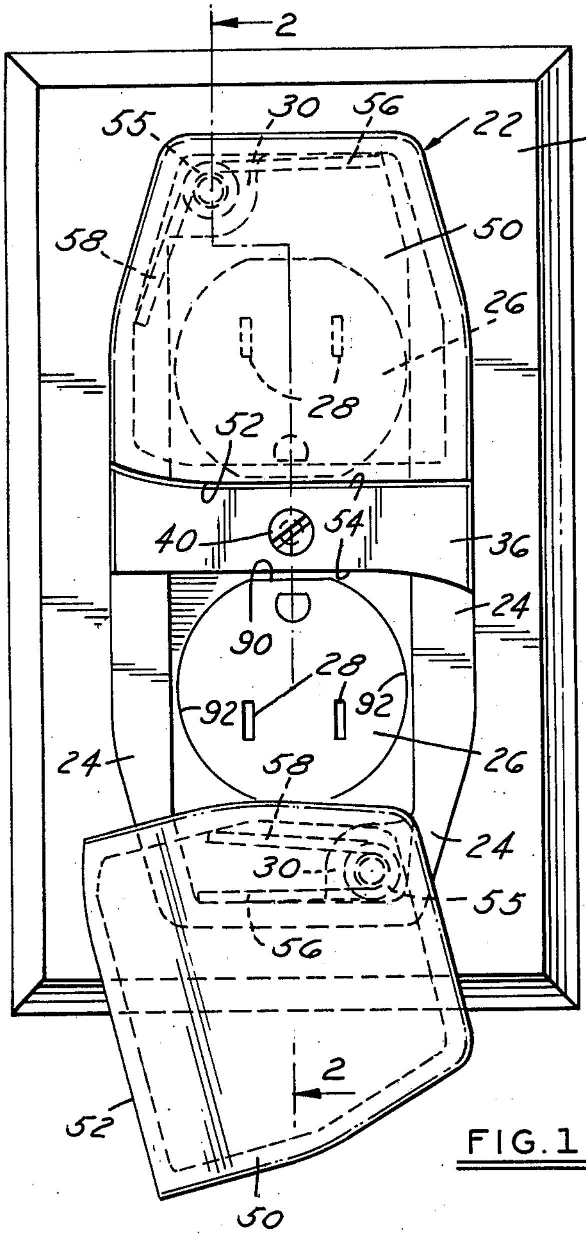
FIG. 1, a front elevation of an installed protector unit.
Figure 2:
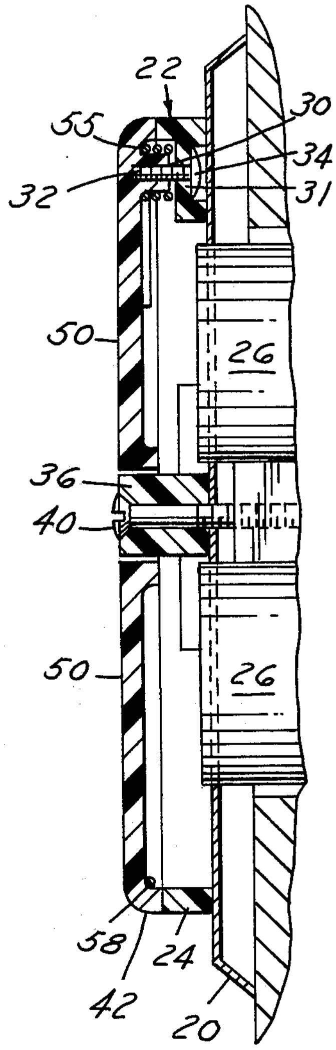
FIG. 2, a sectional view on line 2—2 of FIG. 1.

With reference to the drawings:

A standard wall plug plate 20 is shown in FIG. 1, this plate being normally retained by a single screw central to the plate. A molded plastic housing 22 has a shallow surround or perimeter wall 24 which forms a closed perimeter around the housing in a configuration between spaced planes to encompass the wall plug outlets 26 having the prong openings 28. This housing has corner constructions 30 including septum 31 to receive and support a screw or rivet shank 32 and head 34. A center bar 36 bridges the vertical sidewalls of the unit and extends above the plane of the surround wall as shown in FIG. 2. A screw 40 which is a little longer than the usual screw for holding a wall plate transfixes the center bar and is anchored in a standard threaded hole in the wall outlet structure.

Two identical molded cover plate units 50 are shaped to enclose the housing 22 with one edge 52 fitting the side 54 of the center bar. A short boss is formed at one corner of each cover unit to receive the shank of screw or rivet 34. This boss serves as a locator for a coil spring 55 which surrounds the boss on the cover and has one arm extension 56 to lie within the end portion of surround wall 24 and another arm extension 58 to lie against a depending flange 42 of each cover unit 50.

In FIG. 1, at the top, the door 50 is shown in closed position, the coil spring serving to hold the door 50 closed with edge 52 against the edge 54 of the center bar 36. At the bottom of the drawing, the door or cover unit 50 is shown in open position against the spring 36. If door 50 is released, it will spring shut so that edge 52 contacts edge 54 of the center bar.

In order to insert a plug, the cover 50 must be moved manually away from the protector unit and held in the open position while a plug is inserted. Once inserted, the plug will hold the cover open until the plug is removed. Then the cover will slam shut.

Figure 4:
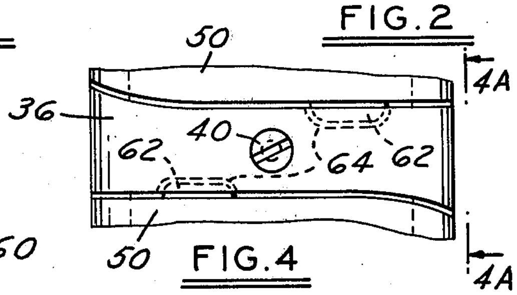
FIG. 4, a front view of a modification.
Figure 3:
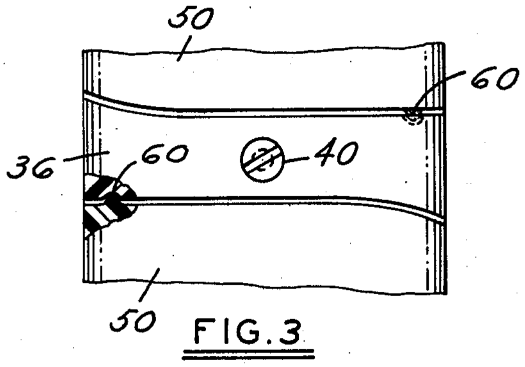
FIG 3, a breakway view of an optional detent retainer.
Figure 4A:
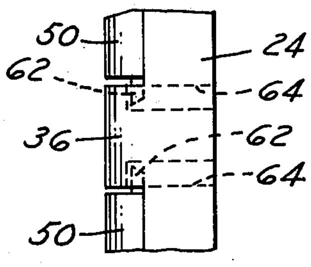
FIG. 4A, a side view of the FIG. 4 modification.
Figure 7:
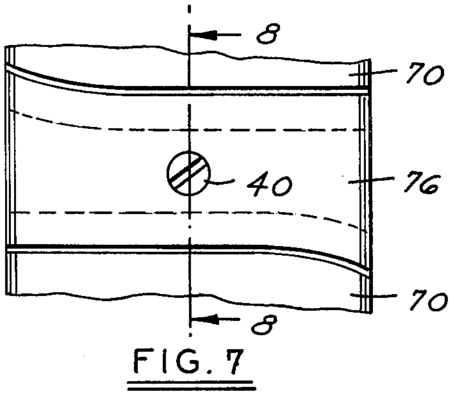
FIG. 7, a front partial view illustrating a modified edge retainer construction.
Figure 8:
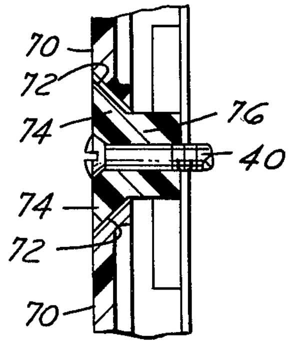
FIG. 8, a section on line 8—8 of FIG. 7.

If desired, a detent 60 can be used to engage a recess in a cover unit and thus provide additional resistance to the opening of the device. In FIGS. 4 and 4A, a tab 62 is shown on the closure plate 50 which will engage a recess 64 opening below the outer surface of the center cross bar to prevent a lifting of the cover unit from the assembly when in closed position. In FIGS. 7 and 8, the cover units 70 are provided with a beveled edge 72 which interfits under a lip 74 on the center bar 76 so the swinging covers cannot be pried or pulled open. In other words, the covers must be swung open against the spring bias.

Figure 5:
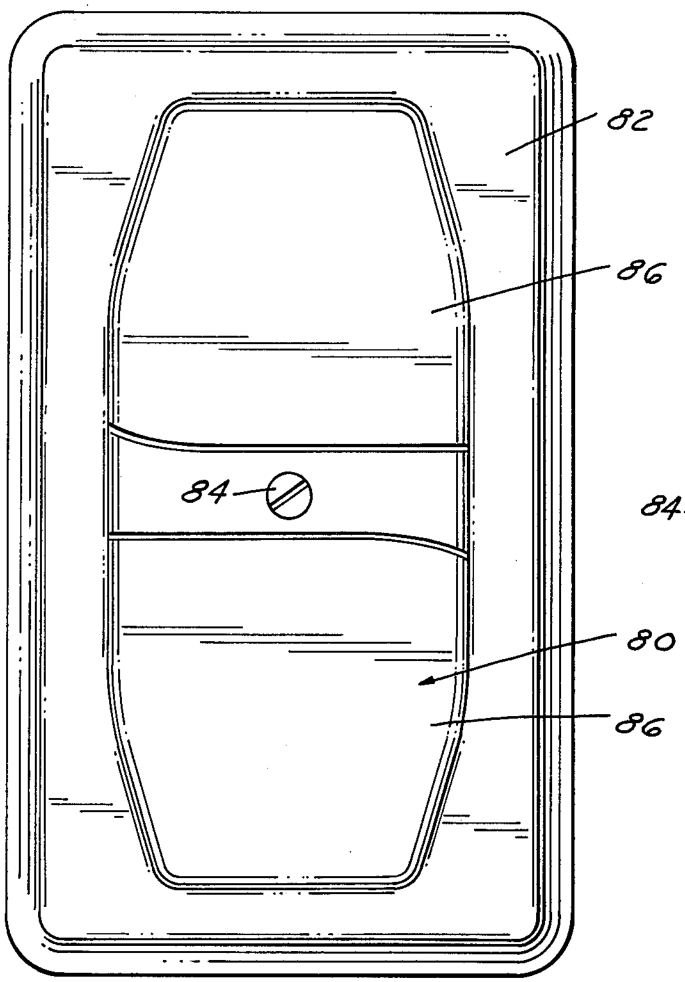
FIG. 5, a view of a modification which unifies the protector plate and the wall outlet plate.
Figure 6:
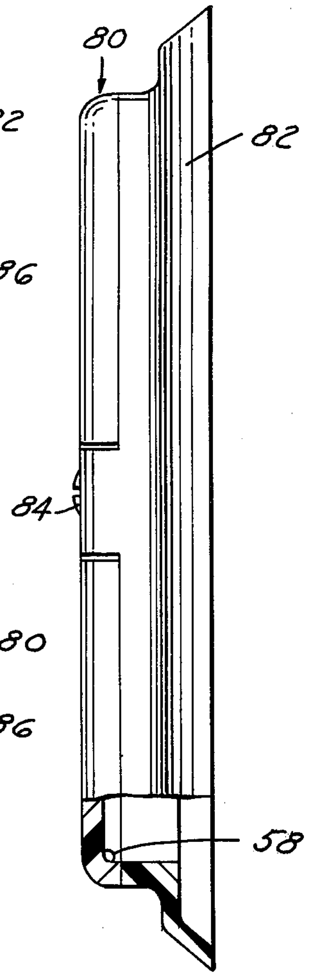
FIG. 6, a side view of the unified plate partially in section.

In FIGS. 5 and 6, there is shown a wall outlet plate 80 formed integrally with the wall plate 82 and retained by a single screw 84. Closure plates 86 are mounted and function in the same manner as previously described. This embodiment can be used for new installations or replacement. In either case, a single screw holds the plate in place.

In all of the embodiments disclosed, an important feature is the shallow nature of the device which follows from the distinctive design. The overall thickness in an actual device can be less than ½ inch, one embodiment having a dimension of 0.425". Thus, the structure lies flat to the wall and since the closure plates move in the plane of the wall, there is no projection at any time which will cause inconvenience. If the inserted prong plug is pulled out of the wall socket, the spring-biased closures will immediately close to the protective position.

Another feature of the disclosure construction lies in the self-stabilizing function. With reference to FIGS. 1 and 2, it will be noted that the wall plug outlets 26 project outwardly some distance from the plate 20. Particularly on more recent installations, this projection is 1/16 to 3/32 of an inch. Also, the modern receptacles are flattened at chordal lines of the facing areas, as at 90. As shown best in FIG. 1, the frame 24 is designed to have close contact with the projecting portions of these receptacles. The cross bar or center bar 36 lies close to the chordal lines 90 and the inner walls of the frame 24 lie close to the outer periphery of the receptacles as at 92. Accordingly, when the frame 24 is fitted over the receptacles and fixed against the plate 20, the frame 24 is stabilized against turning and the single screw provides an adequate fastener for secure placement of the device.

What I claim is:

1. A protector device for electrical wall outlets for preventing access by children which comprises:

(a) a shallow perimeter wall lying between spaced parallel planes dimensioned to encompass one or more electrical outlet sockets, (b) a cross bar bridging opposed walls of said perimeter and positioned to lie over a threaded retention hole in a wall socket and having a screw hole to register with said retention hole, (c) a closure plate on said perimeter wall to overlie each outlet socket encompassed by said wall, (d) means to mount each said closure plate on and outside said perimeter wall to pivot on an axis normal to the said parallel planes for pivotal movement only from a closed position overlying an outlet socket, the perimeter of each said closure plate overlying the said perimeter wall in closed position except for that portion adjacent said cross bar, to a position exposing said outlet socket, and (e) resilient means associated with said wall and each said closure plate to bias said closure plate to a closed position.

2. A protector device as defined in claim 1 in which the inner surfaces of the perimeter wall are positioned to lie in close proximity to the sides of receptacles in a wall outlet to prevent turning of the device when installed.

3. A protector device for electrical wall outlets for preventing access by children which comprises:

(a) a shallow perimeter wall lying between spaced parallel planes dimensioned to encompass one or more electrical outlet sockets, (b) a cross bar bridging opposed walls of said perimeter and positioned to lie over a threaded retention hole in a wall socket and having a screw hole to register with said retension hole, (c) a closure plate on said perimeter wall to overlie each outlet socket encompassed by said wall, (d) means to mount each said closure plate to pivot on an axis normal to the said parallel planes for movement from a closed position overlying an outlet socket to a position exposing said outlet socket, and (e) resilient means associated with said wall and each said closure plate to bias said closure plate to a closed position, (f) said means to mount a closure plate comprising a shank mounted on said wall to provide a pivot shank for one corner of a closure plate, (g) each closure plate having a flange projecting toward said perimeter wall, and a coil spring surrounding said pivot shank having one end extended to contact said perimeter wall and one end extended to contact said flange.

4. A protector device as defined in claim 3 in which said closure member has a boss formed to receive said shank and said coil spring surrounds said boss.

5. A protector device for electrical wall outlets for preventing access by children which comprises:

(a) a shallow perimeter wall lying between spaced parallel planes dimensioned to encompass one or more electrical outlet sockets, (b) a cross bar bridging opposed walls of said perimeter and positioned to lie over a threaded retention hole in a wall socket and having a screw hole to register with said retention hole, (c) a closure plate on said perimeter wall to overlie each outlet socket encompassed by said wall, (d) means to mount each said closure plate to pivot on an axis normal to the said parallel planes for movement from a closed position overlying an outlet socket to a position exposing said outlet socket, (e) resilient means associated with said wall and each said closure plate to bias said closure plate to a closed position, (f) an edge on said closure plate and an edge on said cross bar shaped to engage in the closed position of the closure plate to form a stop for the plate, and (g) means provided on said respective edges to overlap in a direction perpendicular to the plane of said closure plate to prevent lateral displacement of said plate away from said perimeter wall in the closed position.

6. A protector device for electrical wall outlets for preventing access by children which comprises:

(a) a shallow perimeter wall lying between spaced parallel planes dimensioned to encompass one or more electrical outlet sockets, (b) a cross bar bridging opposed walls of said perimeter and positioned to lie over a threaded retention hole in a wall socket and having a screw hole to register with said retention hole, (c) a closure plate on said perimeter wall to overlie each outlet socket encompassed by said wall, (d) means to mount each said closure plate to pivot on an axis normal to the said parallel planes for movement from a closed position overlying an outlet socket to a position exposing said outlet socket, (e) resilient means associated with said wall and each said closure plate to bias said closure plate to a closed position, (f) an edge on said closure plate and an edge on said cross bar shaped to engage in the closed position of the closure plate to form a stop for the plate, and (g) one edge of said cross bar being formed with a re-entrant bevel and an edge of said closure plate being formed with a bevel to underlie said reentrant bevel in closed position.

7. A protector device for electrical wall outlets for preventing access by children which comprises:

(a) a shallow perimeter wall lying between spaced parallel planes dimensioned to encompass one or more electrical outlet sockets, (b) a cross bar bridging opposed walls of said perimeter and positioned to lie over a threaded retention hole in a wall socket and having a screw hole to register with said retention hole, (c) a closure plate on said perimeter wall to overlie each outlet socket encompassed by said wall, (d) means to mount each said closure plate to pivot on an axis normal to the said parallel planes for movement from a closed position overlying an outlet socket to a position exposing said outlet socket, (e) resilient means associated with said wall and each said closure plate to bias said closure plate to a closed position, (f) an edge on said closure plate and an edge on said cross bar shaped to engage in the closed position of the closure plate to form a stop for the plate, and (g) a detent projection and recess formed respectively on the engaging edges of said plate and said cross bar to engage in the closed position.

8. A protector device for electrical wall outlets for preventing access by children which comprises:

(a) a shallow perimeter wall lying between spaced parallel planes dimensioned to encompass one or more electrical outlet sockets, (b) a cross bar bridging opposed walls of said perimeter and positioned to lie over a threaded retention hole in a wall socket and having a screw hole to register with said retention hole, (c) a closure plate on said perimeter wall to overlie each outlet socket encompassed by said wall, (d) means to mount each said closure plate to pivot on an axis normal to the said parallel planes for movement from a closed position overlying an outlet socket to a position exposing said outlet socket, (e) resilient means associated with said wall and each said closure plate to bias said closure plate to a closed position, and (f) said cross bar being recessed on the sides facing the ends of the device and below the outer face, and said closure plate being provided with projecting tabs to engage said respective recesses to lock the plate against movement normal to the plane of the plate when in closed position.

* * * * *